United States Patent
Lin et al.

(10) Patent No.: US 10,180,374 B1
(45) Date of Patent: Jan. 15, 2019

(54) TEST DEVICE AND METHOD FOR TESTING CONTACT LENS AND TEST DEVICE FOR TESTING HYDROUS ELEMENT

(71) Applicant: National Applied Research Laboratories, Taipei (TW)

(72) Inventors: Yu-Hsuan Lin, Taipei (TW); Hsin-Yi Tsai, Taipei (TW); Kuo-Cheng Huang, Taipei (TW); Min-Wei Hung, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 15/827,501

(22) Filed: Nov. 30, 2017

(30) Foreign Application Priority Data

Sep. 15, 2017 (TW) .............................. 106131849 A

(51) Int. Cl.
| | |
|---|---|
| *G01B 9/00* | (2006.01) |
| *G01M 11/00* | (2006.01) |
| *G01M 11/02* | (2006.01) |
| *A45C 11/00* | (2006.01) |
| *G02C 7/04* | (2006.01) |
| *G02C 7/08* | (2006.01) |
| *G02C 7/02* | (2006.01) |

(52) U.S. Cl.
CPC ........... *G01M 11/31* (2013.01); *A45C 11/005* (2013.01); *G01M 11/0207* (2013.01); *G02C 7/04* (2013.01); *G02C 7/022* (2013.01); *G02C 7/085* (2013.01)

(58) Field of Classification Search
CPC . G01M 11/0285; G01M 11/08; G02B 26/023; G02C 7/04

USPC .......................................... 356/124–137, 445
See application file for complete search history.

(56) References Cited

U.S. PATENT DOCUMENTS

| | | | | | |
|---|---|---|---|---|---|
| 6,765,661 | B2 * | 7/2004 | Biel | .................. | G01M 11/0278 356/124 |
| 9,863,842 | B2 * | 1/2018 | Tonn | .................. | G01M 11/0285 |
| 2012/0133957 | A1 * | 5/2012 | Widman | ................ | G01B 11/06 356/624 |
| 2014/0368812 | A1 * | 12/2014 | Humphry | ............... | G01B 11/24 356/124 |
| 2017/0089802 | A1 | 3/2017 | Tonn | | |

FOREIGN PATENT DOCUMENTS

TW            M497287 U       3/2015

* cited by examiner

*Primary Examiner* — Hoa Pham
(74) *Attorney, Agent, or Firm* — Haynes and Boone, LLP

(57) ABSTRACT

A test device for testing a first contact lens classified as a specific type of contact lens is disclosed. The test device includes a light emitting unit and a detection unit. The light emitting unit emits a first incident light to the first contact lens to generate a first reflected light having a first light intensity, and the detection unit receives the first reflected light, in response to the first light intensity generates a first light intensity value, and implements a specific water content algorithm based on the first light intensity value to estimate an actual water content associated with the first contact lens, wherein the specific water content algorithm is constructed based on a water content reference data associated with the specific type of contact lens and a corresponding light intensity measurement data associated with the water content reference data.

20 Claims, 6 Drawing Sheets

TEST DEVICE AND METHOD FOR TESTING CONTACT LENS AND TEST DEVICE FOR TESTING HYDROUS ELEMENT

CROSS-REFERENCE TO RELATED APPLICATION AND CLAIM OF PRIORITY

The application claims the benefit of Taiwan Patent Application No. 106131849, filed on Sep. 15, 2017, at the Taiwan Intellectual Property Office, the disclosures of which are incorporated herein in their entirety by reference.

FIELD OF THE INVENTION

The present invention relates to a test device, and more particularly to a test device and method for testing contact lenses.

BACKGROUND OF THE INVENTION

The water content of a contact lens is expressed as (M−m)×100/M, wherein M is the mass of a contact lens in an aqueous equilibrium state, and m is the mass of a contact lens in a dry state. Commercially available contact lenses detection methods used by manufacturers are mostly coulometric or polarography. Although these two methods have been certified by the International Organization for Standardization (ISO), the operations are time-consuming, the equipment is not easy to carry and is susceptible to environmental impact, resulting in relative inconvenience in measurement.

TW No. M497287 U discloses a contact lens test vehicle. U.S. Publication Patent No. 20170089802 A1 discloses a method for characterizing a spectacle.

The technical scheme for testing a contact lens in the prior art generally focuses on measuring the lens flaw and/or contour integrity of the contact lens and optimizing the stage for placing the contact lens and detecting the handling method. In addition, multiple contact lens test schemes in the prior art employ contact measurement and are not innovative about the measurement methodology. Although these methods are mature, the contact manner and electrochemical principles will cause problems with hygiene, health and discomfort. Therefore, a more innovative non-contact type of optical detection technology should be developed to improve the quality of contact lens.

In order to overcome the drawbacks in the prior art, a test device and method for testing contact lenses are disclosed. The particular design in the present invention not only solves the problems described above, but is also easy to implement. Thus, the present invention has utility for industry.

SUMMARY OF THE INVENTION

In accordance with one aspect of the present invention, a test device for testing a first contact lens classified as a specific type of contact lens is disclosed. The test device includes a light emitting unit emitting a first incident light to the first contact lens to generate a first reflected light having a first light intensity; and a detection unit receiving the first reflected light, in response to the first light intensity generating a first light intensity value, and implementing a specific water content algorithm based on the first light intensity value to estimate an actual water content associated with the first contact lens, wherein the specific water content algorithm is constructed based on a water content reference data associated with the specific type of contact lens and a corresponding light intensity measurement data associated with the water content reference data.

In accordance with another aspect of the present invention, a test method for testing a first contact lens of a specific type is disclosed. The test method includes the following steps: emitting a first incident light to the first contact lens to generate a first reflected light having a first light intensity; generating a first light intensity value in response to the first light intensity; and implementing a specific water content algorithm based on the first light intensity value to estimate an actual water content associated with the first contact lens, wherein the specific water content algorithm is constructed based on a water content reference data associated with the specific type and a corresponding light intensity measurement data associated with the water content reference data.

In accordance with a further aspect of the present invention, a test device for testing a first hydrous element of a specific type is disclosed. The test device includes a light emitting unit emitting a first incident light to the first hydrous element to generate a first reflected light having a first light intensity; and a detection unit receiving the first reflected light, in response to the first light intensity, generating a first light intensity value, and implementing a specific water content algorithm based on the first light intensity value to estimate an actual water content associated with the first hydrous element, wherein the specific water content algorithm is constructed based on a water content reference data associated with the specific type of hydrous element and a corresponding to light intensity measurement data associated with the water content reference data.

The objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 1:
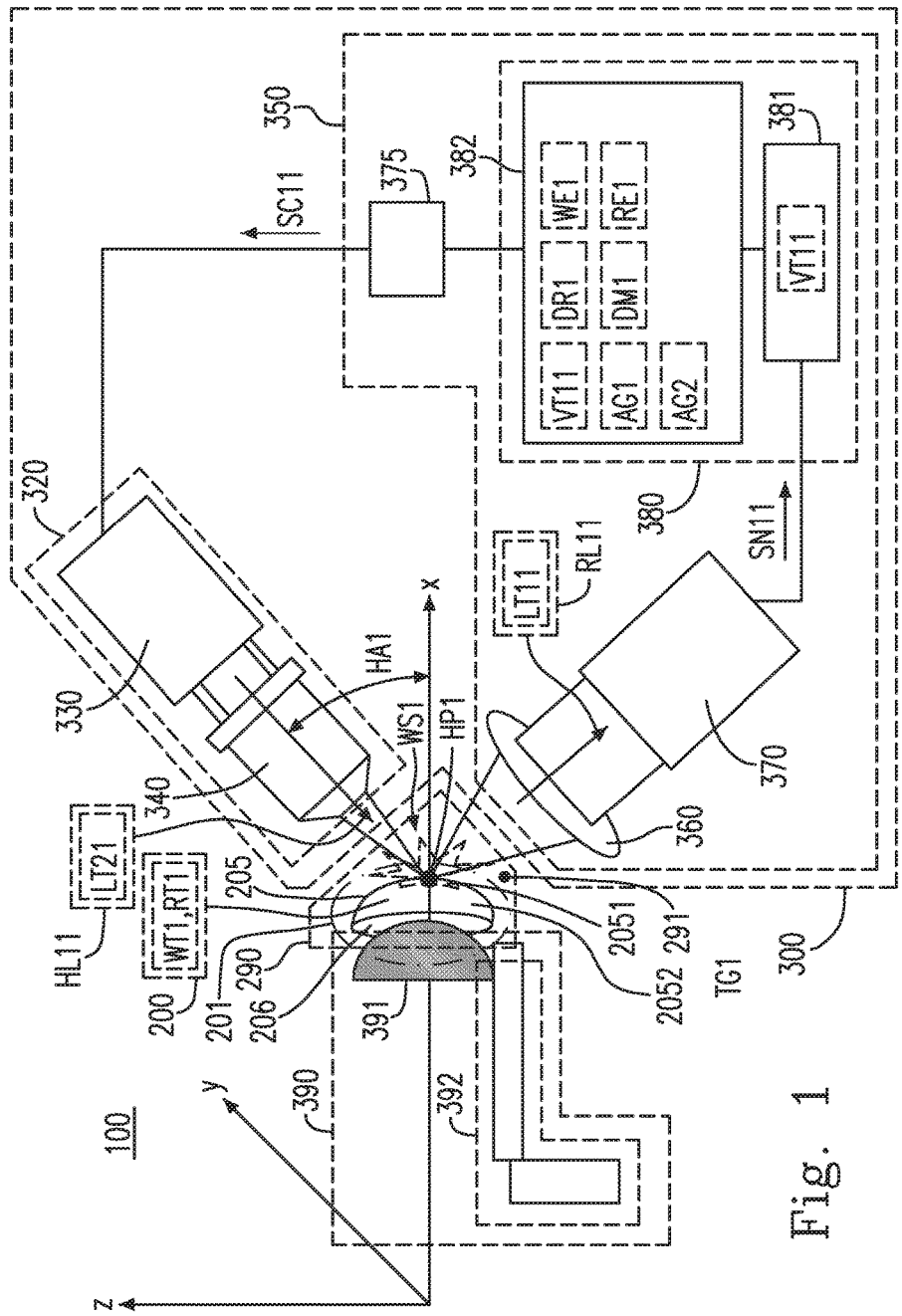
FIG. 1 shows a schematic diagram of a test system according to a preferred embodiment of the present invention.

Please refer to FIG. 1, which shows a schematic diagram of a test system according to a preferred embodiment of the present invention. The test system 100 includes a first contact lens 200 of a specific type of contact lens 290, and a test device 300 used for testing the first contact lens 200. The test device 300 includes a light emitting unit 320 and a detection unit 350. The detection unit 350 is optically coupled to the light emitting unit 320 through the first contact lens 200.

The light emitting unit 320 emits a first incident light HL11 to the first contact lens 200 to cause the first contact lens 200 to generate a first reflected light RL11, in which the first reflected light RL11 has a first light intensity LT11. The detection unit 350 generates a first light intensity value VT11 in response to the first light intensity LT11 and implements a specific water content algorithm AG1 based on the first light intensity value VT11 to estimate an actual water content actual water content WT1 associated with the first contact lens 200, wherein the specific water content algorithm AG1 is constructed based on a water content reference data DR1 associated with the specific type of contact lens 290 and a corresponding light intensity measurement data DM1 associated with the water content reference data DR1.

In some embodiments, the light emitting unit 320 includes a light source unit 330 and an objective lens 340. The objective lens 340 is optically coupled to the light source unit 330 and optically coupled to the first contact lens 200. The light source unit 330 emits the first incident light HL11. For example, the light source unit 330 is a light emitting diode (LED) unit, the first incident light HL11 is white light and has high intensity. The objective lens 340 is disposed between the light source unit 330 and the first contact lens 200, and guides the first incident light HL11 to the first contact lens 200. The objective lens 340 has a magnification factor. For example, the magnification factor is 10.

The detection unit 350 includes an optical power sensor 370, a condensing lens 360 and a processor 380. The condensing lens 360 is optically coupled to the first contact lens 200. The optical power sensor 370 is optically coupled to the condensing lens 360. The processor 380 is electrically coupled to the optical power sensor 370. The optical power sensor 370 outputs a sensing signal SN11 in response to the first light intensity LT11. The condensing lens 360 is disposed between the first contact lens 200 and the optical power sensor 370, and guides the first reflected light RL11 to the optical power sensor 370. The processor 380 provides the specific water content algorithm AG1, determines the first light intensity value VT11 in response to the sensing signal, and implements the specific water content algorithm AG1 based on the first light intensity value VT11 to estimate the actual water content WT1. For example, the first contact lens 200 is soft contact lenses.

For example, the optical power sensor 370 is a photodiode power sensor. The processor 380 includes a power meter 381 coupled to the optical power sensor 370 and a calculation unit 382 coupled to the power meter 381. The power meter 381 determines the first light intensity value VT11 in response to the sensing signal SN11. The calculation unit 382 provides the specific water content algorithm AG1, obtains the first light intensity value VT11 from the power meter 381, and implements the specific water content algorithm AG1 to estimate the actual water content WT1 based on the first light intensity value VT11.

In some embodiments, the first incident light HL11 has a second light intensity LT21, and is incident at a first incident point HP1 on the first contact lens 200 with a first incident angle HA1. The first incident angle HA1 ranges from 30° to 60°. When the first incident light HL1 is incident at the first incident point HP1, the first incident point HP1 is in a wrinkled condition WS1, and generates the first reflected light RL11 via forming a light scattering. Because the first contact lens 200 is dry, the first incident point HP1 is in a wrinkled condition WS1. The first light intensity LT11 is determined by the wrinkled condition WS1. Due to the light scattering, there is a beam divergence between the first incident point HP1 and the condensing lens 360.

For example, the first contact lens 200 has a first surface 205 and a second surface 206 opposite to the first surface 205. For instance, the first surface 205 and the second surface 206 are a front surface and a back surface respectively. The first surface 205 has a central area 2051 and a peripheral area 2052 associated with the central area 2051. The central area 2051 includes the first incident point HP1. The test system 100 has reference coordinate axes x, y and z.

The detection unit 350 further includes a holding unit 390. The holding unit 390 is configured to hold the first contact lens 200 and includes a holder 391 and a three-axis manual table 392 coupled to the holder 391. The first contact lens 200 is irremovably coupled to the holder 391. The holder 391 is configured to hold the first contact lens 200 and has a specific color and a specific shape. For instance, the specific shape is the same as the shape of human eyeball, and the specific color is black. When the first contact lens 200 is irremovably coupled to the holder 391, the location of the first contact lens 200 is adjustable by using the three-axis manual table 392. The detection unit 350 determines an estimated water content WE1 by estimating the actual water content WT1. The test device 300 tests the first contact lens 200 in a testing time TG1 to determine the estimated water content WE1.

In some embodiments, the detection unit 350 further includes a controller 375 coupled to the light source unit 330. The controller 375 is configured to control the light source unit 330, and outputs a control signal SC11 to perform a light intensity control on the light source unit 330. The light source unit 330 emits the first incident light HL11 in response to the control signal SC11. The first incident light HL11 has a light wavelength and the second light intensity LT21. The control signal SC11 is configured to control the second light intensity LT21. The light wavelength belongs to a visible light band (wavelengths from 380 nm to 750 nm). The controller 375 is further coupled to the processor 380, and controlled by the processor 380.

In some embodiments, the light source unit 330 emits light belonging to the visible light band (from 380 nm to 750 nm), in which the intensity of the light can be switched by the processor 380 via the controller 375 automatically. The optical power sensor 370 is disposed on the path of the reflected light to capture the reflected light intensity that the light irradiates the first contact lens 200 to input the sensing signal SN11. The processor 380 receives the sensing signal SN11, generates light intensity information (such as the first light intensity value VT11) in response to the sensing signal SN11, and utilizes the light intensity information to perform immediate calculation. Therefore the processor 380 estimates the water content and water retention while wearing the first contact lens 200 by using the light intensity information (such as the first light intensity value VT11).

For example, the test duration of the test device 300 that tests the first contact lens 200 needs no more than one second. The test duration starts from a first time to a second time. At the first time, the processor 380 causes the controller 375 to output the control signal SC11. At the second time, the processor 380 obtains a measured result associated with the water content and water retention by determining the first light intensity value VT11. The test method of the test device 300 includes a calculation program such as the intensity control of the visible light source, the light intensity signal acquisition, the value estimation of the water content, and the value estimation of the water retention.

Figure 2:
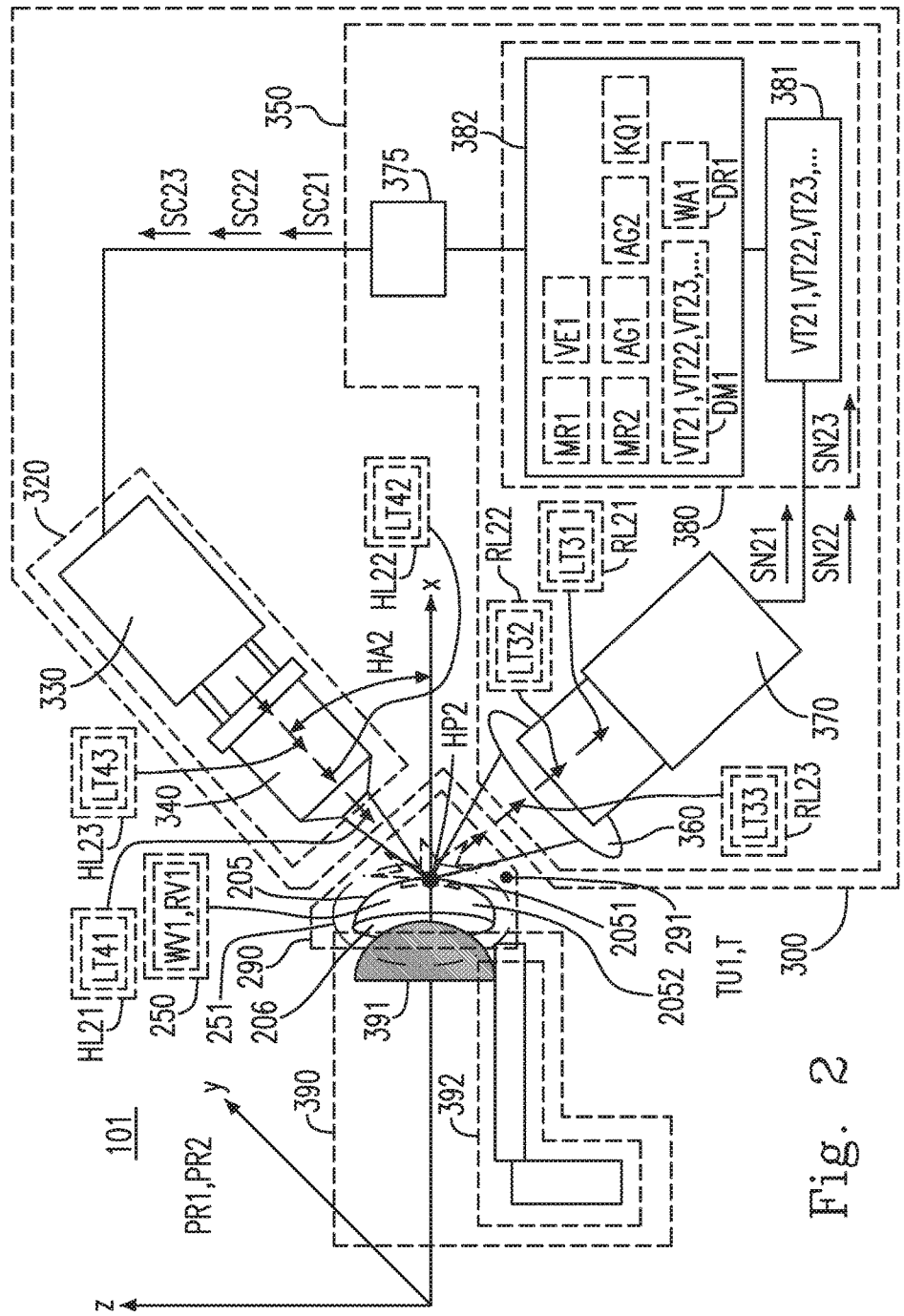
FIG. 2 shows a schematic diagram of a test system according to another preferred embodiment of the present invention.

Please refer to FIG. 2, which shows a schematic diagram of a test system 101 according to another preferred embodiment of the present invention. The test system 101 includes a second contact lens 250 of the specific type of contact lens 290, and the test device 300 used for testing the second contact lens 250. The test system 101 is configured to perform a calibration test to the specific type of contact lens 290.

Please refer to FIG. 1. The second contact lens 250 of the specific type of contact lens 290 is tested by the test device 300 before the testing time TG1. The light emitting unit 320 emits a plurality of incident lights HL21, HL22, HL23 . . . sequentially to the second contact lens 250 based on a specific time interval TU1 to cause the second contact lens 250 to generate a plurality of reflected lights RL21, RL22, RL23 . . . corresponding to the plurality of incident lights HL21, HL22, HL23 . . . respectively and sequentially. The plurality of reflected lights RL21, RL22, RL23 . . . have a first plurality of light intensities LT31, LT32, LT33 . . . respectively. The plurality of incident lights HL21, HL22, HL23 . . . have a second plurality of light intensities LT41, LT42, LT43 . . . respectively, and are incident at a second incident point HP2 on the second contact lens 250 with a second incident angle HA2. The second light intensity LT21 is substantially equal to each of the second plurality of light intensities LT41, LT42, LT43 . . . . The first incident angle HA1 is substantially equal to the second incident angle HA2. For example, the specific time interval TU1 is 60 seconds.

In some embodiments, the processor 380 causes the controller 375 to output a plurality of control signals SC21, SC22, SC23 . . . based on the specific time interval TU1. In some embodiments, the controller 375 outputs the plurality of control signals SC21, SC22, SC23 . . . based on the specific time interval TU1. The light emitting unit 320 emits the plurality of incident lights HL21, HL22, HL23 . . . corresponding to the plurality of control signals SC21, SC22, SC23 . . . respectively and sequentially in response to the plurality of control signals SC21, SC22, SC23 . . . .

The detection unit 350 generates a plurality of sensing signals SN21, SN22, SN23 . . . corresponding to the first plurality of light intensities LT31, LT32, LT33 . . . respectively and sequentially in response to the first plurality of light intensities LT31, LT32, LT33 . . . , and determines a plurality of light intensity values VT21, VT22, VT23 . . . corresponding to the plurality of sensing signals SN21, SN22, SN23 . . . respectively and sequentially based on the plurality of sensing signals SN21, SN22, SN23 . . . , wherein the light intensity measurement data DM1 includes the plurality of light intensity values VT21, VT22, VT23 . . . . The water content reference data DR1 includes initial water content WA1.

The first contact lens 200 and the second contact lens 250 actually have the same physical properties. The plurality of light intensity values VT21, VT22, VT23 . . . include a maximum light intensity value VE1 configured to correspond to the initial water content WA1. The detection unit 350 estimates a first physical relationship PR1 between a variable water content WV1 associated with the specific type of contact lens 290 and a time T to determine a first mathematical relationship MR1 for expressing the first physical relationship PR1 based on the plurality of light intensity values VT21, VT22, VT23 . . . and the initial water content WA1. The specific water content algorithm AG1 is constructed based on the first mathematical relationship MR1.

The derivative of the variable water content WV1 with respect to the time T is expressed as a variable water capacity RV1. The detection unit 350 estimates a second physical relationship PR2 between the variable water capacity RV1 and the time T to determine a second mathematical relationship MR2 for expressing the second physical relationship PR2 by performing a differentiation operation KQ1 on the first mathematical relationship MR1. The detection unit 350 further provides a specific water capacity algorithm AG2 constructed based on the second mathematical relationship MR2. The detection unit 350 performs the specific water capacity algorithm AG2 to estimate an actual water capacity RT1 associated with the first contact lens 200 based on the estimated water content WE1, wherein the detection unit 350 determines an estimated water capacity RE1 by estimating the actual water capacity RT1.

Figure 3:
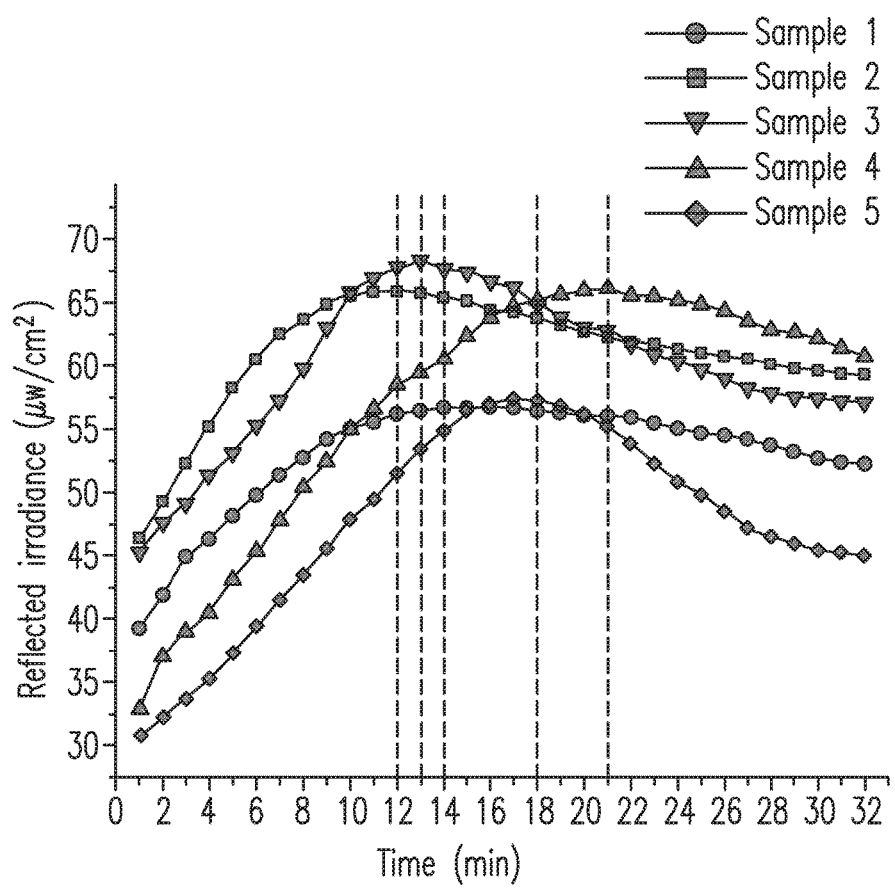
FIG. 3 shows the relationship between the light intensity and the time of the test system shown in FIG. 2.
Figure 4:
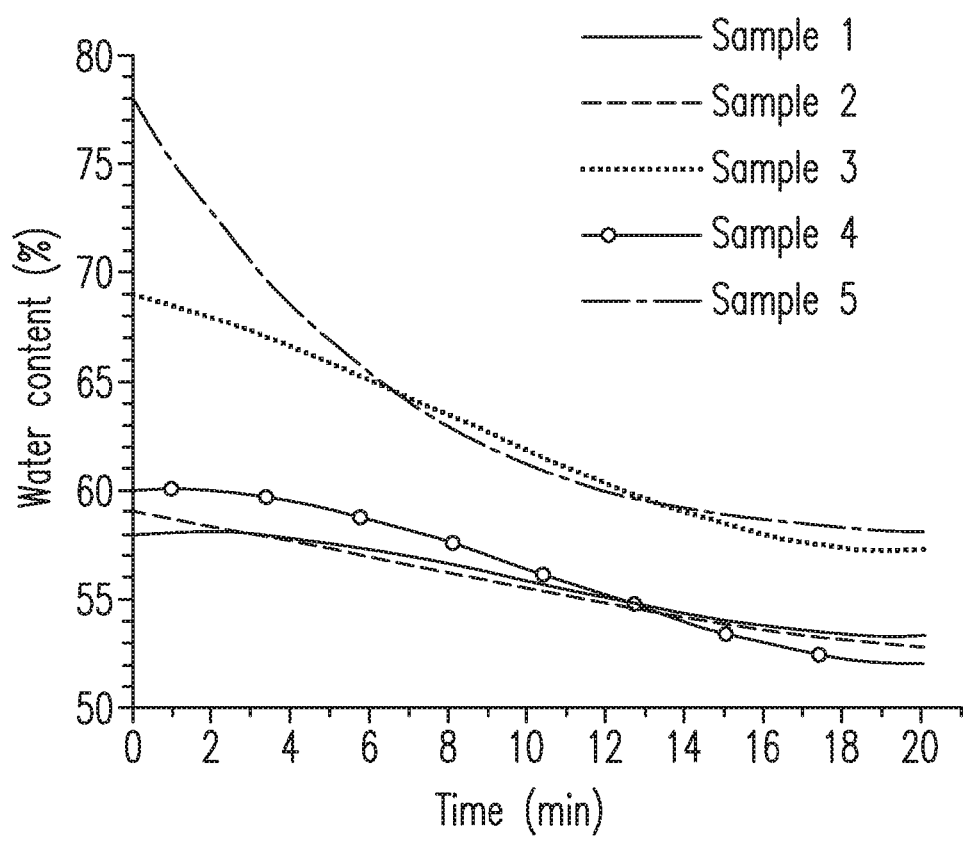
FIG. 4 shows the relationship between the water content and the time of the test system shown in FIG. 2.
Figure 5:
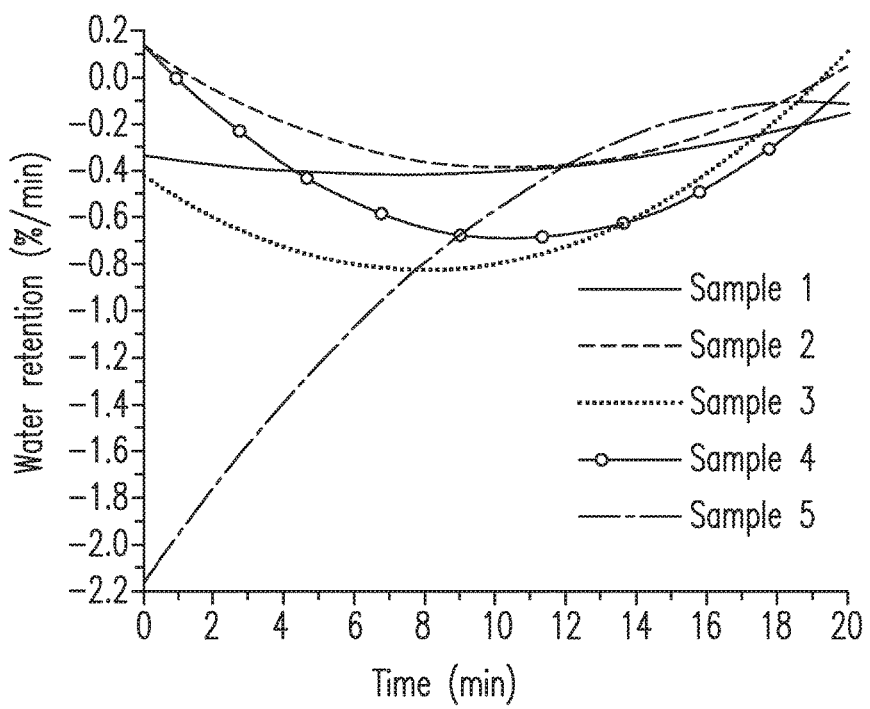
FIG. 5 shows the relationship between the water retention and the time of the test system shown in FIG. 2.

Please refer to FIGS. 3-5. FIG. 3 shows the relationship between the light intensity and the time of the test system 101 shown in FIG. 2. FIG. 4 shows the relationship between the water content and the time of the test system 101 shown in FIG. 2. FIG. 5 shows the relationship between the water retention and the time of the test system 101 shown in FIG. 2. A test method applied in the test system 101 as shown in FIG. 2, the test method includes retrieving a series of reflected lights after exposure of a plurality of contact lenses by a light source unit (such as the light emitting unit 320) by using a light intensity capturing device (such as the detection unit 350). The plurality of contact lenses belong to the plurality of contact lenses types respectively, and include the second contact lens 250. The plurality of contact lenses types are different and include the specific type of contact lens 290. The series of reflected lights include the plurality of reflected lights RL21, RL22, RL23 . . . . As shown in FIG. 4, the plurality of contact lenses are used as a plurality of samples, and have different initial water content respectively. The test method further includes sensing the light intensities of the series of reflected lights to perform the calculation of light intensity and thereby calculating the water content (%) and water retention (%/min) of the plurality of samples.

For each contact lens of the plurality of contact lenses, the test method includes the following steps. Step 1: causing the light emitting unit 320 to irradiate white light on a specific contact lens (such as the first contact lens 200) of the plurality of contact lenses; step 2: retrieving the light intensity information of the reflected light generated from the specific contact lens; step 3: calculating the water content of the specific contact lens by using the light intensity information; step 4: repeating the above step 1, step 2 and step 3, and measuring continuously for at least 20 minutes, wherein one measurement is performed per 60 seconds; step 5: establishing a light intensity variation curve (as shown in FIG. 3) associated with the plurality of contact lenses (or the plurality of contact lens types) and converting the light intensity variation curve into a curve of the relationship between the water content and the time (as shown in FIG. 4) associated with the plurality of contact lenses (or the plurality of contact lens types); step 6: estimating the relationship between the water retention and the time (as shown in FIG. 5) associated with the plurality of contact lenses (or the plurality of contact lens types).

As shown in FIG. 3, the light intensities of the series of reflected lights are expressed as reflected irradiance ($\mu W/cm^2$). In the whole measurement duration, the first plurality of light intensity values of the specific contact lens include a maximum light intensity value. The time at which the maximum light intensity value appears is deemed as a reset time. The maximum light intensity value is configured to correspond to an initial water content of the specific contact lens. Before the reset time, the specific contact lens is full of moisture and in a non-wrinkled condition. After the reset time, the specific contact lens gradually becomes dry and enters a wrinkled condition. Starting from the maximum light intensity value, the second plurality of light intensity values included in the first plurality of light intensity values are used to determine the relationship between the water content and the time (as shown in FIG. 4) associated with the specific contact lens. A differentiation operation on the relationship between the water content and the time (as shown in FIG. 4) is expressed as the relationship between the water retention and the time (as shown in FIG. 5).

In some embodiments, the test device 300 is a device for estimating the water content and the water retention of the wearing contact lens in an optical non-contact measurement. The test device 300 performs projection illumination with a high intensity white LED (such as the light source unit 330) on the central area of the contact lens (such as the first contact lens 200) to be measured, and calculates the water content by the intensity information of the reflected light of the contact lens, and then the value of the water content is treated to estimate the water retention of the different brand of contact lenses. The value of the water retention is not linearly related to the initial value of the water content specified by the manufacturer, so that the actual water content of the contact lens while worn can be measured by the optical non-contact method. For instance, when the first contact lens 200 is worn on the eye, the test device 300 tests the first contact lens 200.

In some embodiments, the test device 300 tests the reflected light intensity of the first contact lens 200 to obtain the reflected light intensity information, and hereby rapidly estimates the actual water content of the first contact lens 200 to determine an estimated water content. The test device 300 further performs a numerical operation based on the estimated water content to estimate actual water retention of the first contact lens 200. As a test device, the development of the test device 300 will be expected to effectively replace the traditional large-scale contact lens testing equipment. The method provided by this disclosure not only has the advantage of non-contact, but also at the same time access to the information of water content and water retention, which will be able to provide doctors and manufacturers to determine the adaptability of contact lenses and performance advantages and disadvantages. The test device 300 not only requires large-scale equipment, but also is a non-contact type and can maintain the hygiene and quality of contact lenses.

Based on FIGS. 1 to 5, a test method for testing a first contact lens 200 of a specific type 290 is disclosed. In some embodiments, the test method includes the following steps: emitting a first incident light HL11 to the first contact lens 200 to generate a first reflected light RL11 having a first light intensity LT11; generating a first light intensity value VT11 in response to the first light intensity LT11; and implementing a specific water content algorithm AG1 based on the first light intensity value VT11 to estimate an actual water content WT1 associated with the first contact lens 200, wherein the specific water content algorithm AG1 is constructed based on a water content reference data DR1 associated with the specific type 290 and a corresponding light intensity measurement data DM1 associated with the water content reference data DR1.

In some embodiments, the first incident light HL11 has a second light intensity LT21, and is incident at a first incident point HP1 on the first contact lens 200 with a first incident angle HA1. The first incident angle HA1 ranges from 30° to 60°. The first incident point HP1 is in a wrinkled condition WS1 when the first incident light HL11 is incident at the first incident point HP1. The first light intensity LT11 is determined by the wrinkled condition WS1. The water content reference data DR1 includes initial water content WA1.

The test method further includes the following steps: providing a second contact lens 250 of the specific type of contact lens 290 beforehand, wherein the first and the second content lens 200 and 250 have the same physical properties; and emitting a plurality of incident lights HL21, HL22, HL23 . . . sequentially to the second contact lens 250 based on a specific time interval TU1 to generate a plurality of reflected lights RL21, RL22, RL23 . . . corresponding to the plurality of incident lights HL21, HL22, HL23 . . . respectively and sequentially. For example, the plurality of reflected lights RL21, RL22, RL23 . . . have a first plurality of light intensities LT31, LT32, LT33 . . . respectively. The plurality of incident lights HL21, HL22, HL23 . . . have a second plurality of light intensities LT41, LT42, LT43 . . . respectively, and are incident at a second incident point HP2 on the second contact lens 250 with a second incident angle HA2. The second light intensity LT21 is substantially equal to each of the second plurality of light intensities LT41, LT42, LT43 . . . . The first incident angle HA1 is substantially equal to the second incident angle HA2.

The test method further includes the following steps: in response to the first plurality of light intensities LT31, LT32, LT33 . . . , generating a plurality of sensing signals SN21, SN22, SN23 . . . corresponding to the first plurality of light intensities LT31, LT32, LT33 . . . sequentially; determining a plurality of light intensity values VT21, VT22, VT23 . . . corresponding to the plurality of sensing signals SN21, SN22, SN23 . . . based on the plurality of sensing signals SN21, SN22, SN23 . . . sequentially, wherein the corresponding light intensity measurement data DM1 includes the plurality of light intensity values VT21, VT22, VT23 . . . , and the plurality of light intensity values VT21, VT22, VT23 . . . include a maximum light intensity value VE1 configured to correspond to the initial water content WA1; determining an estimated water content WE1 by estimating the actual water content WT1; and estimating a first physical relationship PR1 between a variable water content WV1 associated with the specific type of contact lens 290 and a time T to determine a first mathematical relationship MR1 for expressing the first physical relationship PR1 based on the plurality of light intensity values VT21, VT22, VT23 . . . and the initial water content WA1. For instance, the specific water content algorithm AG1 is constructed based on the first mathematical relationship MR1. The derivative of the variable water content WV1 with respect to the time T is expressed as a variable water capacity RV1.

The test method further includes the following steps: estimating a second physical relationship PR2 between the variable water capacity RV1 and the time T to determine a second mathematical relationship MR2 for expressing the second physical relationship PR2 by performing a differentiation operation KQ1 on the first mathematical relationship MR1; providing a specific water capacity algorithm AG2 constructed based on the second mathematical relationship MR2; and performing the specific water capacity algorithm AG2 to estimate an actual water capacity RT1 associated with the first contact lens 200 based on the estimated water content WE1.

Based on FIGS. 1 to 5, a test device 300 for testing a first hydrous element 201 of a specific type of hydrous element 291 is disclosed. In some embodiments, the test device 300 includes a light emitting unit 320 and a detection unit 350. The light emitting unit 320 emits a first incident light HL11 to the first hydrous element 201 to cause the first hydrous element 201 to generate a first reflected light RL11 having a first light intensity LT11. The detection unit 350 in response to the first light intensity LT11 generates a first light intensity value VT11, and implements a specific water content algorithm AG1 based on the first light intensity value VT11 to estimate an actual water content WT1 associated with the first hydrous element 201, wherein the specific water content algorithm AG1 is constructed based on a water content reference data DR1 associated with the specific type of hydrous element 291 and a corresponding light intensity measurement data DM1 associated with the water content reference data DR1.

In some embodiments, the specific type of hydrous element 291 is a specific type of contact lens 290. The first hydrous element 201 is a first contact lens 200 of the specific type of contact lens 290. The first hydrous element 201 has a density distribution, which is continuous. A second hydrous element 251 of specific type of hydrous element 291 is further tested by the test device 300 beforehand so that the detection unit 350 provides the specific water content algorithm AG1 and a specific water capacity algorithm AG2. A first test method for testing the first contact lens 200 is as above-mentioned and similar to a second test method for testing the first hydrous element 201, in which the first test method is adapted to the second test method.

Figure 6:
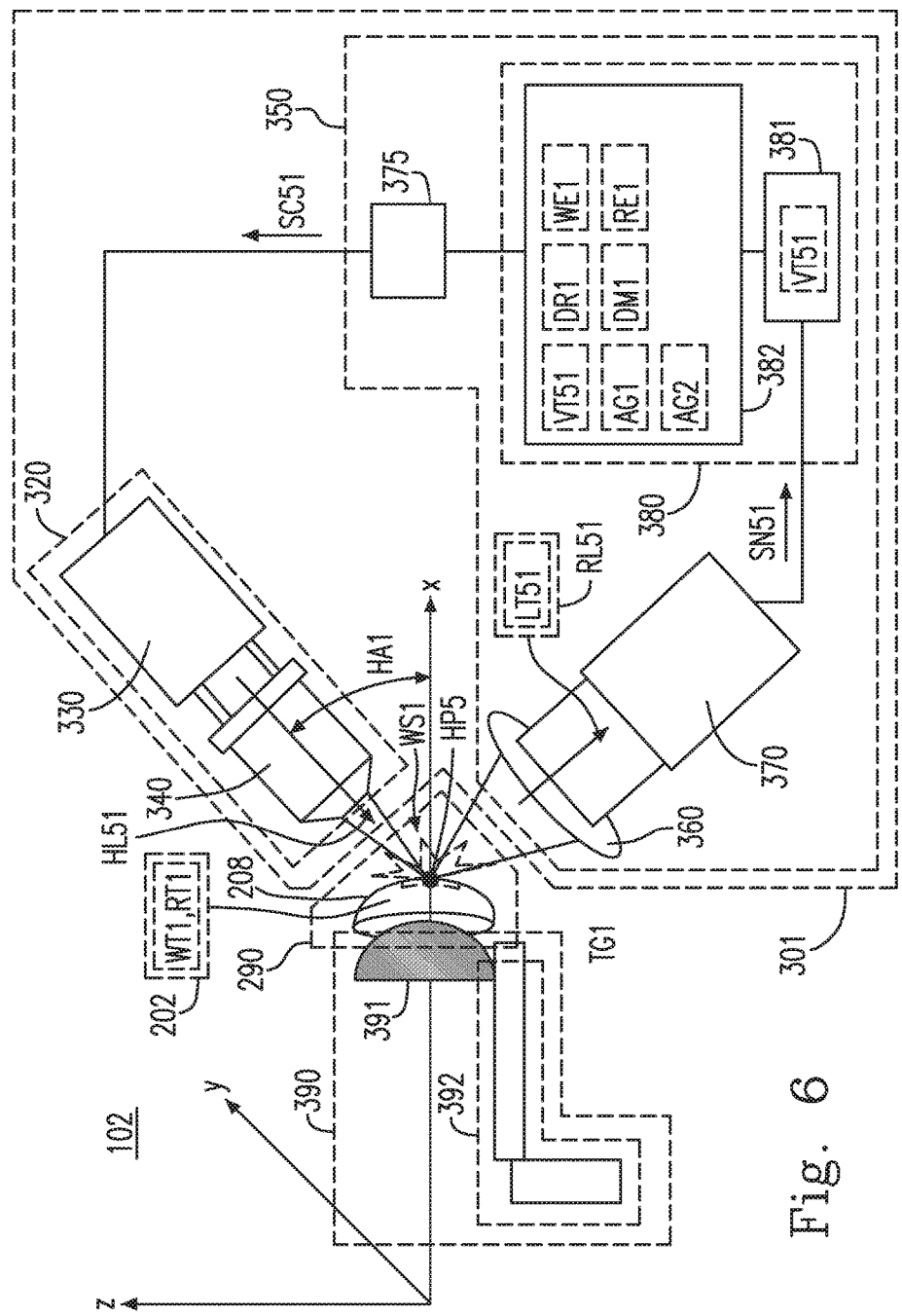
FIG. 6 shows a schematic diagram of a test system according to a further preferred embodiment of the present invention.

Please refer to FIG. 6, which shows a schematic diagram of a test system 102 according to a further preferred embodiment of the present invention. The test system 102 includes a hydrous element 202 and a test device 301 for testing actual water content WT1 of the hydrous element 202. The hydrous element 202 has a surface 208, and the surface 208 has a wrinkled condition WS1. The test device 301 includes a light emitting unit 320 and a detection unit 350. The detection unit 350 is optically coupled to the light emitting unit 320 through the hydrous element 202.

The light emitting unit 320 emits an incident light HL51 to the surface 208 to cause the surface 208 to generate a reflected light RL51, wherein the reflected light RL51 has a light intensity LT51 dependent on the wrinkled condition WS1. The detection unit 350 generates a light intensity value VT51 in response to the light intensity LT51, and estimates the actual water content WT1 based on the light intensity value VT51. For example, the detection unit 350 outputs a control signal SC51, and the light emitting unit 320 emits the incident light HL51 in response to the control signal SC51. For example, the detection unit 350 generates a sensing signal SN51 in response to the light intensity LT51 to determine the light intensity value VT51.

In some embodiments, the hydrous element 202 is a contact lens (such as the first contact lens 200). When the incident light HL51 is incident at an incident point HP5 on the surface 208, the incident point HP5 is in a wrinkled condition WS1. The hydrous element 202 belongs to a specific type of hydrous element 291. The detection unit 350 implements a specific water content algorithm AG1 based on the light intensity value VT51 to estimate the actual water content WT1 associated with the hydrous element 202, wherein the specific water content algorithm AG1 is constructed based on a water content reference data DR1 associated with the specific type of hydrous element 291 and a corresponding light intensity measurement data DM1 associated with the water content reference data DR1.

Embodiments

1. A test device for testing a first contact lens classified as a specific type of contact lens includes a light emitting unit and a detection unit. The light emitting unit emits a first incident light to the first contact lens to generate a first reflected light having a first light intensity, and the detection unit receives the first reflected light, in response to the first light intensity generates a first light intensity value, and implements a specific water content algorithm based on the first light intensity value to estimate an actual water content associated with the first contact lens, wherein the specific water content algorithm is constructed based on a water content reference data associated with the specific type of contact lens and a corresponding light intensity measurement data associated with the water content reference data.

2. In the test device according to Embodiment 1, the first contact lens is a soft contact lens.

3. In the test device according to Embodiments 1-2, the light emitting unit includes a light source unit and an objective lens. The light source unit emits the first incident light, and the objective lens is disposed between the light source unit and the first contact lens, and guides the first incident light to the first contact lens.

4. In the test device according to Embodiments 1-3, the detection unit includes an optical power sensor, a condensing lens and a processor. The optical power sensor outputs a sensing signal in response to the first light intensity. The condensing lens is disposed between the first contact lens and the optical power sensor, and guides the first reflected light to the optical power sensor. The processor provides the specific water content algorithm, in response to the sensing signal, determines the first light intensity value, and implements the specific water content algorithm based on the first light intensity value to estimate the actual water content.

5. In the test device according to Embodiments 1-4, the first incident light has a second light intensity, and is incident at a first incident point on the first contact lens with a first incident angle; the first incident angle ranges from 30° to 60°; the first incident point is in a wrinkled condition when the first incident light is incident at the first incident point; and the first light intensity is determined by the wrinkled condition.

6. In the test device according to Embodiments 1-5, the specific type of contact lens further includes a second contact lens; the second contact lens is tested by the test device beforehand; the light emitting unit emits a plurality of incident lights sequentially to the second contact lens based on a specific time interval to generate a plurality of reflected lights corresponding to the plurality of incident lights respectively and sequentially; the plurality of reflected lights have a first plurality of light intensities respectively; the plurality of incident lights have a second plurality of light intensities respectively, and are incident at a second incident point on the second contact lens with a second incident angle; the second light intensity is substantially equal to each of the second plurality of light intensities; and the first incident angle is substantially equal to the second incident angle.

7. In the test device according to Embodiments 1-6, the detection unit, in response to the first plurality of light intensities, generates a plurality of sensing signals corresponding to the first plurality of light intensities sequentially, and determines a plurality of light intensity values corresponding to the plurality of sensing signals based on the plurality of sensing signals sequentially, wherein the corresponding light intensity measurement data include the plurality of light intensity values; the water content reference data include an initial water content; the detection unit determines an estimated water content by estimating the actual water content; the first and the second contact lens have the same physical properties; the plurality of light intensity values include a maximum light intensity value configured to correspond to the initial water content.

8. In the test device according to Embodiments 1-7, the detection unit estimates a first physical relationship between a variable water content associated with the specific type of contact lens and a time to determine a first mathematical relationship for expressing the first physical relationship based on the plurality of light intensity values and the initial water content; the specific water content algorithm is constructed based on the first mathematical relationship; the derivative of the variable water content with respect to the time is expressed as a variable water capacity; the detection unit estimates a second physical relationship between the variable water capacity and the time to determine a second mathematical relationship for expressing the second physical relationship by performing a differentiation operation on the first mathematical relationship; the detection unit further provides a specific water capacity algorithm constructed based on the second mathematical relationship; and the detection unit performs the specific water capacity algorithm to estimate an actual water capacity associated with the first contact lens based on the estimated water content.

9. A test method for testing a first contact lens of a specific type includes the following steps: emitting a first incident light to the first contact lens to generate a first reflected light having a first light intensity; generating a first light intensity value in response to the first light intensity; and implementing a specific water content algorithm based on the first light intensity value to estimate an actual water content associated with the first contact lens, wherein the specific water content algorithm is constructed based on a water content reference data associated with the specific type and a corresponding light intensity measurement data associated with the water content reference data.

10. In the test method according to Embodiment 9, the first incident light has a second light intensity, and is incident at a first incident point on the first contact lens with a first incident angle; the first incident angle ranges from 30° to 60°; the first incident point is in a wrinkled condition when the first incident light is incident at the first incident point; the first light intensity is determined by the wrinkled condition; and the water content reference data include an initial water content.

11. The test method, according to Embodiments 9-10, further includes the following steps: providing a second contact lens of the specific type beforehand, wherein the first and the second content lens have the same physical properties; and emitting a plurality of incident lights sequentially to the second contact lens based on a specific time interval to generate a plurality of reflected lights corresponding to the plurality of incident lights respectively and sequentially. The plurality of reflected lights have a first plurality of light intensities respectively; the plurality of incident lights have a second plurality of light intensities respectively, and are incident at a second incident point on the second contact lens with a second incident angle; the second light intensity is substantially equal to each of the second plurality of light intensities; and the first incident angle is substantially equal to the second incident angle.

12. The test method, according to Embodiments 9-11, further includes the following steps: in response to the first plurality of light intensities, generating a plurality of sensing signals corresponding to the first plurality of light intensities sequentially; determining a plurality of light intensity values corresponding to the plurality of sensing signals based on the plurality of sensing signals sequentially, wherein the corresponding light intensity measurement data include the plurality of light intensity values, and the plurality of light intensity values include a maximum light intensity value configured to correspond to the initial water content; and determining an estimated water content by estimating the actual water content.

13. The test method, according to Embodiments 9-12, further includes the following steps: estimating a first physical relationship between a variable water content associated with the specific type and a time to determine a first mathematical relationship for expressing the first physical relationship based on the plurality of light intensity values and the initial water content. The specific water content algorithm is constructed based on the first mathematical relationship, and the derivative of the variable water content with respect to the time is expressed as a variable water capacity.

14. The test method, according to Embodiments 9-13, further includes the following steps: estimating a second physical relationship between the variable water capacity and the time to determine a second mathematical relationship for expressing the second physical relationship by performing a differentiation operation on the first mathematical relationship; providing a specific water capacity algorithm constructed based on the second mathematical relationship; and performing the specific water capacity algorithm to estimate an actual water capacity associated with the first contact lens based on the estimated water content.

15. A test device for testing a first hydrous element of a specific type includes a light emitting unit and a detection unit. The light emitting unit emits a first incident light to the first hydrous element to generate a first reflected light having a first light intensity. The detection unit receives the first reflected light, in response to the first light intensity, generates a first light intensity value, and implements a specific water content algorithm based on the first light intensity value to estimate an actual water content associated with the first hydrous element, wherein the specific water content algorithm is constructed based on a water content reference data associated with the specific type of hydrous element and a corresponding light intensity measurement data associated with the water content reference data.

16. In the test device according to Embodiment 15, the light emitting unit includes a light source unit, an objective lens. The light source unit emits the first incident light, and the objective lens is disposed between the light source unit and the first hydrous element, and guides the first incident light to the first hydrous element. The detection unit includes an optical power sensor, a condensing lens and a processor. The optical power sensor outputs a sensing signal in response to the first light intensity. The condensing lens is disposed between the first hydrous element and the optical power sensor, and guides the first reflected light to the optical power sensor. The processor provides the specific water content algorithm, in response to the sensing signal, determines the first light intensity value, and implements the specific water content algorithm based on the first light intensity value to estimate the actual water content.

17. In the test device according to Embodiments 15-16, the first incident light has a second light intensity, and is incident at a first incident point on the first hydrous element with a first incident angle; the first incident angle ranges from 30° to 60°; the first incident point is in a wrinkled condition when the first incident light is incident at the first incident point; and the first light intensity is determined by the wrinkled condition.

18. In the test device according to Embodiments 15-17, the test device further tests a second hydrous element of the specific type; the light emitting unit emits a plurality of incident lights sequentially to the second hydrous element based on a specific time interval to generate a plurality of reflected lights corresponding to the plurality of incident lights respectively and sequentially; the plurality of reflected lights have a first plurality of light intensities respectively; the plurality of incident lights have a second plurality of light intensities respectively, and are incident at a second incident point on the second hydrous element with a second incident angle; the second light intensity is substantially equal to each of the second plurality of light intensities; and the first incident angle is substantially equal to the second incident angle.

19. In the test device according to Embodiments 15-18, the detection unit, in response to the first plurality of light intensities, generates a plurality of sensing signals corresponding to the first plurality of light intensities sequentially, and determines a plurality of light intensity values corresponding to the plurality of sensing signals based on the plurality of sensing signals sequentially, wherein the corresponding light intensity measurement data include the plurality of light intensity values; the water content reference data include an initial water content; the detection unit determines an estimated water content by estimating the actual water content; the first and the second contact lens have the same physical properties; the plurality of light intensity values include a maximum light intensity value configured to correspond to the initial water content.

20. In the test device according to Embodiments 15-19, the detection unit estimates a first physical relationship between a variable water content associated with the specific type and a time to determine a first mathematical relationship for expressing the first physical relationship based on the plurality of light intensity values and the initial water content; the specific water content algorithm is constructed based on the first mathematical relationship; the derivative of the variable water content with respect to the time is expressed as a variable water capacity; the detection unit estimates a second physical relationship between the variable water capacity and the time to determine a second mathematical relationship for expressing the second physical relationship by performing a differentiation operation on the first mathematical relationship; the detection unit further provides a specific water capacity algorithm constructed based on the second mathematical relationship; and the detection unit performs the specific water capacity algorithm to estimate an actual water capacity associated with the first hydrous element based on the estimated water content.

Based on the above, the present invention effectively solves the problems and drawbacks in the prior art, and thus it meets the demands of the industry and is of value.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A test device for testing a first contact lens classified as a specific type of contact lens, comprising:
    a light emitting unit emitting a first incident light to the first contact lens to generate a first reflected light having a first light intensity; and
    a detection unit receiving the first reflected light, in response to the first light intensity generating a first light intensity value, and implementing a specific water content algorithm based on the first light intensity value to estimate an actual water content associated with the first contact lens, wherein the specific water content algorithm is constructed based on a water content reference data associated with the specific type of contact lens and a corresponding light intensity measurement data associated with the water content reference data.

2. The test device as claimed in claim 1, wherein the first contact lens is a soft contact lens.

3. The test device as claimed in claim 1, wherein the light emitting unit includes:
    a light source unit emitting the first incident light; and
    an objective lens disposed between the light source unit and the first contact lens, and guiding the first incident light to the first contact lens.

4. The test device as claimed in claim 1, wherein the detection unit includes:
    an optical power sensor outputting a sensing signal in response to the first light intensity;
    a condensing lens disposed between the first contact lens and the optical power sensor, and guiding the first reflected light to the optical power sensor; and
    a processor providing the specific water content algorithm, in response to the sensing signal, determining the first light intensity value, and implementing the specific water content algorithm based on the first light intensity value to estimate the actual water content.

5. The test device as claimed in claim 1, wherein:
    the first incident light has a second light intensity, and is incident at a first incident point on the first contact lens with a first incident angle;
    the first incident angle ranges from 30° to 60°;
    the first incident point is in a wrinkled condition when the first incident light is incident at the first incident point; and
    the first light intensity is determined by the wrinkled condition.

6. The test device as claimed in claim 5, wherein:
    the specific type of contact lens further includes a second contact lens;
    the second contact lens is tested by the test device beforehand;
    the light emitting unit emits a plurality of incident lights sequentially to the second contact lens based on a specific time interval to generate a plurality of reflected lights corresponding to the plurality of incident lights respectively and sequentially;
    the plurality of reflected lights have a first plurality of light intensities respectively;

the plurality of incident lights have a second plurality of light intensities respectively, and are incident at a second incident point on the second contact lens with a second incident angle;

the second light intensity is substantially equal to each of the second plurality of light intensities; and the first incident angle is substantially equal to the second incident angle.

7. The test device as claimed in claim 6, wherein:

the detection unit, in response to the first plurality of light intensities, generates a plurality of sensing signals corresponding to the first plurality of light intensities sequentially, and determines a plurality of light intensity values corresponding to the plurality of sensing signals based on the plurality of sensing signals sequentially, wherein the corresponding light intensity measurement data include the plurality of light intensity values;

the water content reference data include an initial water content;

the detection unit determines an estimated water content by estimating the actual water content;

the first and the second contact lens have the same physical properties;

the plurality of light intensity values include a maximum light intensity value configured to correspond to the initial water content.

8. The test device as claimed in claim 7, wherein:

the detection unit estimates a first physical relationship between a variable water content associated with the specific type of contact lens and a time to determine a first mathematical relationship for expressing the first physical relationship based on the plurality of light intensity values and the initial water content;

the specific water content algorithm is constructed based on the first mathematical relationship;

the derivative of the variable water content with respect to the time is expressed as a variable water capacity;

the detection unit estimates a second physical relationship between the variable water capacity and the time to determine a second mathematical relationship for expressing the second physical relationship by performing a differentiation operation on the first mathematical relationship;

the detection unit further provides a specific water capacity algorithm constructed based on the second mathematical relationship; and the detection unit performs the specific water capacity algorithm to estimate an actual water capacity associated with the first contact lens based on the estimated water content.

9. A test method for testing a first contact lens of a specific type, comprising the following steps:

emitting a first incident light to the first contact lens to generate a first reflected light having a first light intensity;

generating a first light intensity value in response to the first light intensity; and implementing a specific water content algorithm based on the first light intensity value to estimate an actual water content associated with the first contact lens, wherein the specific water content algorithm is constructed based on a water content reference data associated with the specific type and a corresponding light intensity measurement data associated with the water content reference data.

10. The test method as claimed in claim 9, wherein:

the first incident light has a second light intensity, and is incident at a first incident point on the first contact lens with a first incident angle;

the first incident angle ranges from 30° to 60°;

the first incident point is in a wrinkled condition when the first incident light is incident at the first incident point;

the first light intensity is determined by the wrinkled condition; and the water content reference data include an initial water content.

11. The test method as claimed in claim 10, further comprising the following steps:

providing a second contact lens of the specific type beforehand, wherein the first and the second content lens have the same physical properties; and emitting a plurality of incident lights sequentially to the second contact lens based on a specific time interval to generate a plurality of reflected lights corresponding to the plurality of incident lights respectively and sequentially, wherein:

the plurality of reflected lights have a first plurality of light intensities respectively;

the plurality of incident lights have a second plurality of light intensities respectively, and are incident at a second incident point on the second contact lens with a second incident angle;

the second light intensity is substantially equal to each of the second plurality of light intensities; and the first incident angle is substantially equal to the second incident angle.

12. The test method as claimed in claim 11, further comprising the following steps:

in response to the first plurality of light intensities, generating a plurality of sensing signals corresponding to the first plurality of light intensities sequentially;

determining a plurality of light intensity values corresponding to the plurality of sensing signals based on the plurality of sensing signals sequentially, wherein the corresponding light intensity measurement data include the plurality of light intensity values, and the plurality of light intensity values include a maximum light intensity value configured to correspond to the initial water content; and determining an estimated water content by estimating the actual water content.

13. The test method as claimed in claim 12, further comprising the following steps:

estimating a first physical relationship between a variable water content associated with the specific type and a time to determine a first mathematical relationship for expressing the first physical relationship based on the plurality of light intensity values and the initial water content, wherein:

the specific water content algorithm is constructed based on the first mathematical relationship; and the derivative of the variable water content with respect to the time is expressed as a variable water capacity.

14. The test method as claimed in claim 13, further comprising the following steps:

estimating a second physical relationship between the variable water capacity and the time to determine a second mathematical relationship for expressing the second physical relationship by performing a differentiation operation on the first mathematical relationship;

providing a specific water capacity algorithm constructed based on the second mathematical relationship; and performing the specific water capacity algorithm to estimate an actual water capacity associated with the first contact lens based on the estimated water content.

15. A test device for testing a first hydrous element of a specific type, comprising:
a light emitting unit emitting a first incident light to the first hydrous element to generate a first reflected light having a first light intensity; and
a detection unit receiving the first reflected light, in response to the first light intensity, generating a first light intensity value, and implementing a specific water content algorithm based on the first light intensity value to estimate an actual water content associated with the first hydrous element, wherein the specific water content algorithm is constructed based on a water content reference data associated with the specific type of hydrous element and a corresponding light intensity measurement data associated with the water content reference data.

16. The test device as claimed in claim 15, wherein:
the light emitting unit includes:
a light source unit emitting the first incident light; and
an objective lens disposed between the light source unit and the first hydrous element, and guiding the first incident light to the first hydrous element; and
the detection unit includes:
an optical power sensor outputting a sensing signal in response to the first light intensity;
a condensing lens disposed between the first hydrous element and the optical power sensor, and guiding the first reflected light to the optical power sensor; and
a processor providing the specific water content algorithm, in response to the sensing signal, determining the first light intensity value, and implementing the specific water content algorithm based on the first light intensity value to estimate the actual water content.

17. The test device as claimed in claim 15, wherein:
the first incident light has a second light intensity, and is incident at a first incident point on the first hydrous element with a first incident angle;
the first incident angle ranges from 30° to 60°;
the first incident point is in a wrinkled condition when the first incident light is incident at the first incident point; and
the first light intensity is determined by the wrinkled condition.

18. The test device as claimed in claim 17, wherein:
the test device further tests a second hydrous element of the specific type;
the light emitting unit emits a plurality of incident lights sequentially to the second hydrous element based on a specific time interval to generate a plurality of reflected lights corresponding to the plurality of incident lights respectively and sequentially;
the plurality of reflected lights have a first plurality of light intensities respectively;
the plurality of incident lights have a second plurality of light intensities respectively, and are incident at a second incident point on the second hydrous element with a second incident angle;
the second light intensity is substantially equal to each of the second plurality of light intensities; and
the first incident angle is substantially equal to the second incident angle.

19. The test device as claimed in claim 18, wherein:
the detection unit, in response to the first plurality of light intensities, generates a plurality of sensing signals corresponding to the first plurality of light intensities sequentially, and determines a plurality of light intensity values corresponding to the plurality of sensing signals based on the plurality of sensing signals sequentially, wherein the corresponding light intensity measurement data include the plurality of light intensity values;
the water content reference data include an initial water content;
the detection unit determines an estimated water content by estimating the actual water content;
the first and the second contact lens have the same physical properties;
the plurality of light intensity values include a maximum light intensity value configured to correspond to the initial water content.

20. The test device as claimed in claim 19, wherein:
the detection unit estimates a first physical relationship between a variable water content associated with the specific type and a time to determine a first mathematical relationship for expressing the first physical relationship based on the plurality of light intensity values and the initial water content;
the specific water content algorithm is constructed based on the first mathematical relationship;
the derivative of the variable water content with respect to the time is expressed as a variable water capacity;
the detection unit estimates a second physical relationship between the variable water capacity and the time to determine a second mathematical relationship for expressing the second physical relationship by performing a differentiation operation on the first mathematical relationship;
the detection unit further provides a specific water capacity algorithm constructed based on the second mathematical relationship; and
the detection unit performs the specific water capacity algorithm to estimate an actual water capacity associated with the first hydrous element based on the estimated water content.

* * * * *